United States Patent
Yeh et al.

(10) Patent No.: US 8,314,593 B2
(45) Date of Patent: Nov. 20, 2012

(54) POWER-SAVING LINE INTERACTIVE UNINTERRUPTIBLE POWER SYSTEM

(75) Inventors: Shou-Ting Yeh, Taipei (TW); Yung-Mei Lin, Taipei (TW)

(73) Assignee: Cyber Power System Inc., Taipei (TW)

( * ) Notice: Subject to any disclaimer, the term of this patent is extended or adjusted under 35 U.S.C. 154(b) by 520 days.

(21) Appl. No.: 12/603,952

(22) Filed: Oct. 22, 2009

(65) Prior Publication Data

US 2011/0095727 A1 Apr. 28, 2011

(30) Foreign Application Priority Data

Aug. 28, 2009 (TW) .................. 98215886 U

(51) Int. Cl.
*H02J 7/00* (2006.01)
(52) U.S. Cl. .................. 320/128; 320/107; 320/163
(58) Field of Classification Search ............. 320/107, 320/128, 135, 138, 145, 163
See application file for complete search history.

(56) References Cited

U.S. PATENT DOCUMENTS

| | | | | |
|---|---|---|---|---|
| 5,602,462 A * | 2/1997 | Stich et al. | ............ | 323/258 |
| 5,856,712 A * | 1/1999 | Suzuki et al. | ............ | 307/64 |
| 6,178,514 B1 * | 1/2001 | Wood | ............ | 713/300 |
| 6,218,744 B1 * | 4/2001 | Zahrte et al. | ............ | 307/64 |
| 2002/0140403 A1 * | 10/2002 | Reddy | ............ | 320/162 |

* cited by examiner

*Primary Examiner* — Edward Tso
*Assistant Examiner* — Aaron Piggush
(74) *Attorney, Agent, or Firm* — patenttm.us

(57) ABSTRACT

A power-saving line interactive UPS has a power switch set, a low-frequency transformer, a full-bridge circuit, a main controller, a charge and discharge mode controller, a rechargeable battery and a high-frequency charging circuit. The high-frequency circuit is connected between an AC power input terminal and the rechargeable battery to convert the AC power into a DC power and charge the rechargeable battery. Therefore, when the AC power is normally supplied and the power capacity of the rechargeable battery is not full, the high-frequency charging circuit is activated to charge the rechargeable battery without charging the rechargeable battery through the low-frequency transformer and the full-bridge switching circuit, thereby effectively reducing overall power consumption.

10 Claims, 5 Drawing Sheets

POWER-SAVING LINE INTERACTIVE UNINTERRUPTIBLE POWER SYSTEM

BACKGROUND OF THE INVENTION

1. Field of the Invention

The present invention is related to an uninterruptible power system (UPS), and more particularly to a power-saving line interactive UPS.

2. Description of the Related Art

With reference to FIG. 4, a conventional line interactive UPS has a power switch set (50), a low-frequency transformer (51), a full-bridge switching circuit (52), a main controller (53), a charge and discharge mode controller (54) and a rechargeable battery (55).

The power switch set (50) is serially connected between an AC power supply and a load and determines if the AC power supply supplies power to the load.

The low-frequency transformer (51) has two windings (511a, 511b). One of the windings (511a) is connected to the load and connected to the AC power supply through the power switch set (50).

The full-bridge switching circuit (52) has two half-bridge switching circuits (521, 522). Serially connected nodes of the two half-bridge switching circuits (521, 522) are connected to the other winding (511b) of the low-frequency transformer (51).

The main controller (53) is connected to the power switch set (50).

The charge and discharge mode controller (54) is connected to the main controller (53) and the full-bridge switching circuit (52), and activates the full-bridge switching circuit (52) to enter a charging or discharging mode in accordance with the charge command or a discharge command of the main controller (53).

The rechargeable battery (55) is connected to the full-bridge switching circuit (52) and performs charging or discharging through the full-bridge switching circuit (52).

Given the aforementioned line interactive UPS, the main controller (53) determines the status of the current AC power supply and the power capacity of the rechargeable battery (55), and outputs the charge command or the discharge command to the charge and discharge mode controller (54). Furthermore, the charge and discharge mode controller (54) decides to execute a charging mode or a discharging mode. When the AC power supply normally supplies power, the main controller (53) controls the power switch set (52) to switch on or off so that the AC power is directly inputted to the load and the low-frequency transformer (51). If determining that the power capacity of the rechargeable battery (55) drops during this period, the main controller (53) controls the full-bridge switching circuit (52) through the charge and discharge mode controller (54) to convert the AC power into a DC current and charge the rechargeable battery (55) until the power capacity of the rechargeable battery (55) is full. However, once an irregularity or outage of the AC power is detected, the main controller (53) immediately switches off the power switch set (50) and outputs a discharge command to the charge and discharge mode controller (54). The charge and discharge mode controller (54) then activates the full-bridge switching circuit (52) to convert the DC power stored in the rechargeable battery (55) into an AC power and supply the AC power to the load, so as to realize interruptible power. As the UPS is always connected with the load, it is called a line interactive UPS. Although such UPS secures the rechargeable battery to maintain its full power capacity, charging to the rechargeable battery is performed through the conversion of the low-frequency transformer (51) and the full-bridge switching circuit (52). As a result, maintaining full power capacity of the rechargeable battery consumes more power.

SUMMARY OF THE INVENTION

An objective of the present invention is to provide a power-saving line interactive UPS. When the AC power normally supplies power, a high-frequency charging loop is adopted to charge the rechargeable battery and maintain the full power capacity thereof.

To achieve the foregoing objective, the power-saving line interactive UPS has a power switch set, a low-frequency transformer, a full-bridge switching circuit, a main controller, a charge and discharge mode controller, a rechargeable battery and a high-frequency charging circuit.

The power switch set is connected to an AC power input terminal adapted to connect to an AC power supply, and determines if the AC power supply supplies power to a load.

The low-frequency transformer has two windings. One winding is adapted to connect to the load and is adapted to connect to the AC power supply.

The full-bridge switching circuit has two half-bridge switching circuits having serially connected nodes connected to the other winding of the low-frequency transformer.

The main controller is connected to the power switch set.

The charge and discharge mode controller is connected to the main controller and the full-bridge switching circuit and activates the full-bridge switching circuit to enter a charging mode or a discharging mode in accordance with a charge command or a discharge command from the main controller.

The rechargeable battery is connected to the full-bridge switching circuit and performs charging or discharging through the full-bridge switching circuit.

The high-frequency charging circuit is connected between the AC power input terminal and the rechargeable battery and converts the AC power into a DC power to charge the rechargeable battery.

When the AC power normally supplies power, the high-frequency charger is activated if detecting that the power capacity of the rechargeable battery is not full. The DC current outputted from a rectifier of the high-frequency charging circuit is converted into a DC power with a specific voltage and is supplied to charge the rechargeable battery and maintain the full power capacity of the rechargeable battery. Therefore, the line interactive UPS of the present invention can charge the rechargeable battery without going through the low-frequency transformer and the full-bridge switching circuit and effectively prevent additional power consumption.

DETAILED DESCRIPTION OF THE INVENTION

Figure 1:
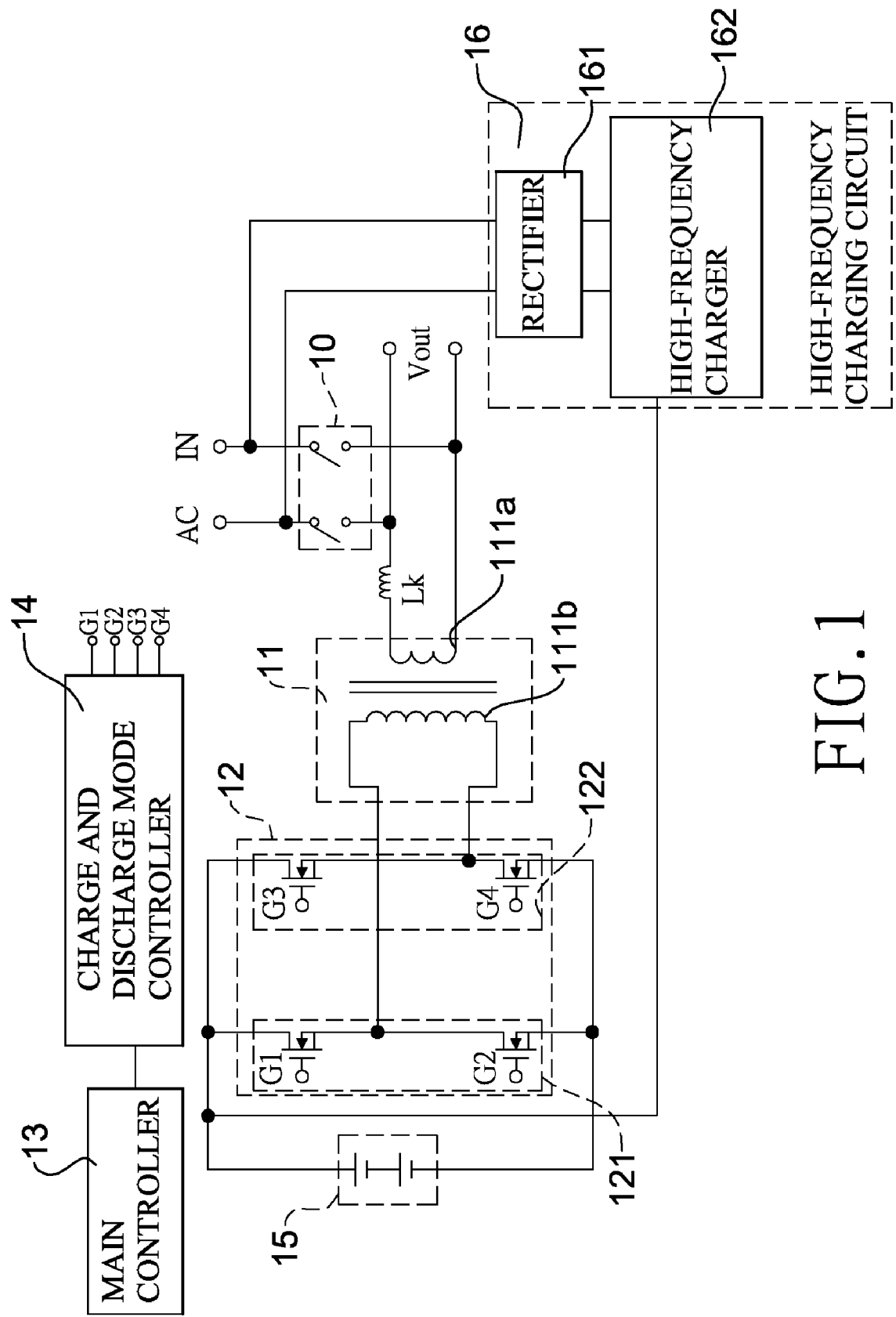
FIG. 1 is a circuit diagram of a first preferred embodiment of a line interactive UPS in accordance with the present invention.

With reference to FIG. 1, a first embodiment of a line interactive UPS in accordance with the present invention has a power switch set (10), a low-frequency transformer (11), a full-bridge switching circuit (12), a main controller (13), a charge and discharge mode controller (14), a rechargeable battery (15) and a high-frequency charging circuit (16).

The power switch set (10) is connected with an AC power input terminal (AC IN). The AC power input terminal (AC IN) is connected to an AC power supply. The power switch set (10) determines if the AC power is supplied to a load (not shown). In the present embodiment, one terminal of the power switch set (10) is connected to the AC power input terminal (AC IN) and the other terminal ($V_{out}$) is connected to the load. In other words, the power switch set (10) is serially connected between the AC power input terminal (AC IN) and the load.

The low-frequency transformer (11) has two windings (111a, 111b). One winding (111a) is connected to the load and is connected to the AC power supply through the power switch set (10).

The full-bridge switching circuit (12) has two half-bridge switching circuits (121, 122). Serially connected nodes of the two half-bridge switching circuits (121, 122) are connected to the other winding (111b) of the low-frequency transformer (11).

The main controller (13) is connected to the power switch set (10).

The charge and discharge mode controller (14) is connected to the main controller (13) and the full-bridge switching circuit (12), and activates the full-bridge switching circuit (12) to enter a charging or discharging mode in accordance with a charge command or a discharge command from the main controller (12).

The rechargeable battery (15) is connected to the full-bridge switching circuit (12) to perform charging or discharging through the full-bridge switching circuit (12).

The high-frequency charging circuit (16) is connected between the AC power input terminal (AC IN) and the rechargeable battery (15) to convert the AC power into a DC current and charge the rechargeable battery (15). In the present embodiment, the high-frequency circuit (16) has a rectifier (161) and a high-frequency charger (162).

The aforementioned line interactive UPS mainly adds a high-frequency charging circuit (16) between the AC power input terminal (AC IN) and the rechargeable battery (15). When the AC power supply normally supplies power, the high-frequency charging circuit (16) is activated if the power capacity of the rechargeable battery is not full and is detected. The DC power outputted by the rectifier (161) is converted to a DC power with a specific voltage, which is supplied to the rechargeable battery (15) to charge the rechargeable battery (15) and maintain full power capacity of the rechargeable battery (15). Hence, the line interactive UPS charges the rechargeable battery (15) without going through the low-frequency transformer (11) and the full-bridge switching circuit (12), and thus effectively avoids additional power loss.

Figure 2:
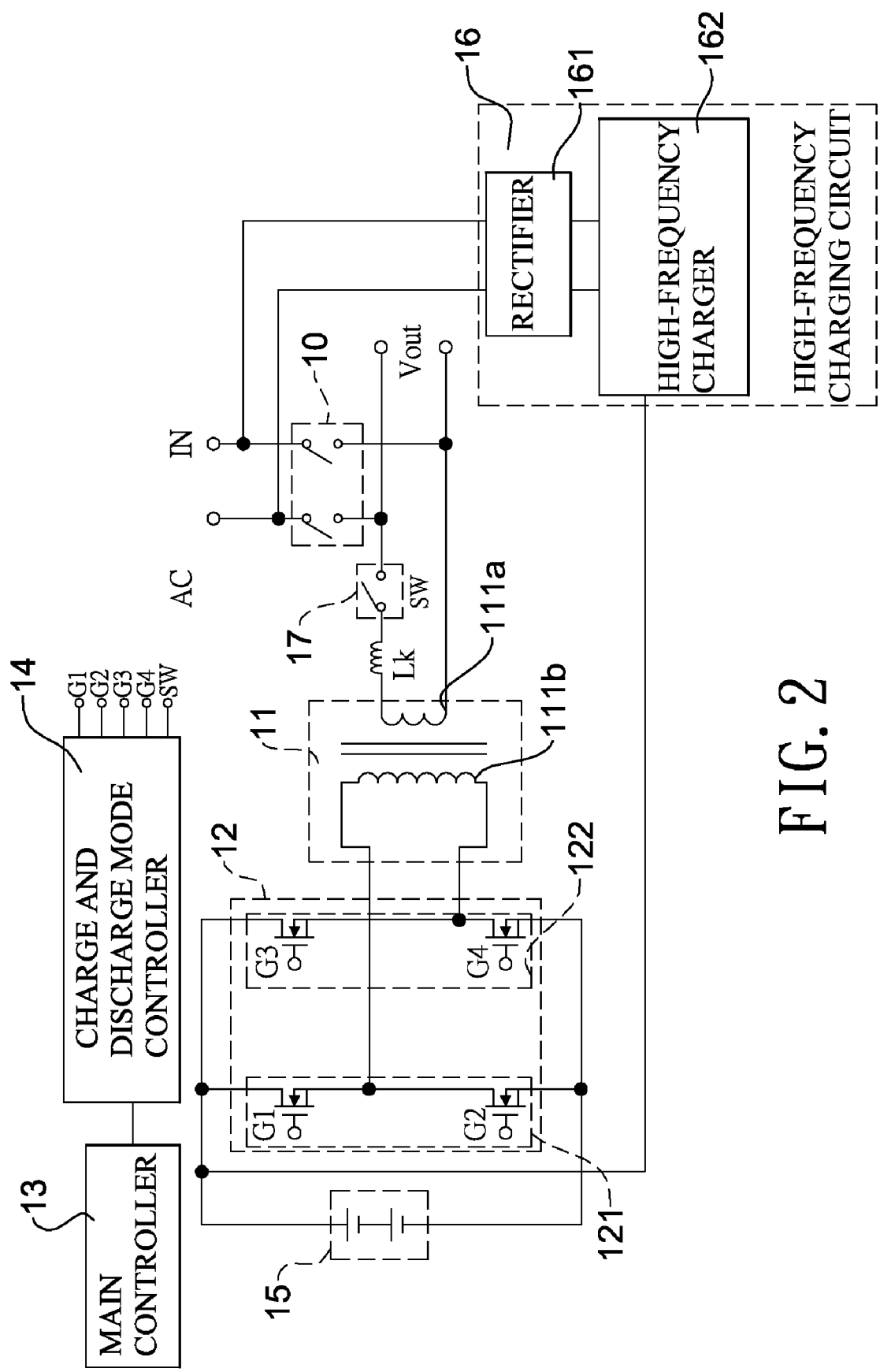
FIG. 2 is a circuit diagram of a second preferred embodiment of a line interactive UPS in accordance with the present invention.
Figure 3A:
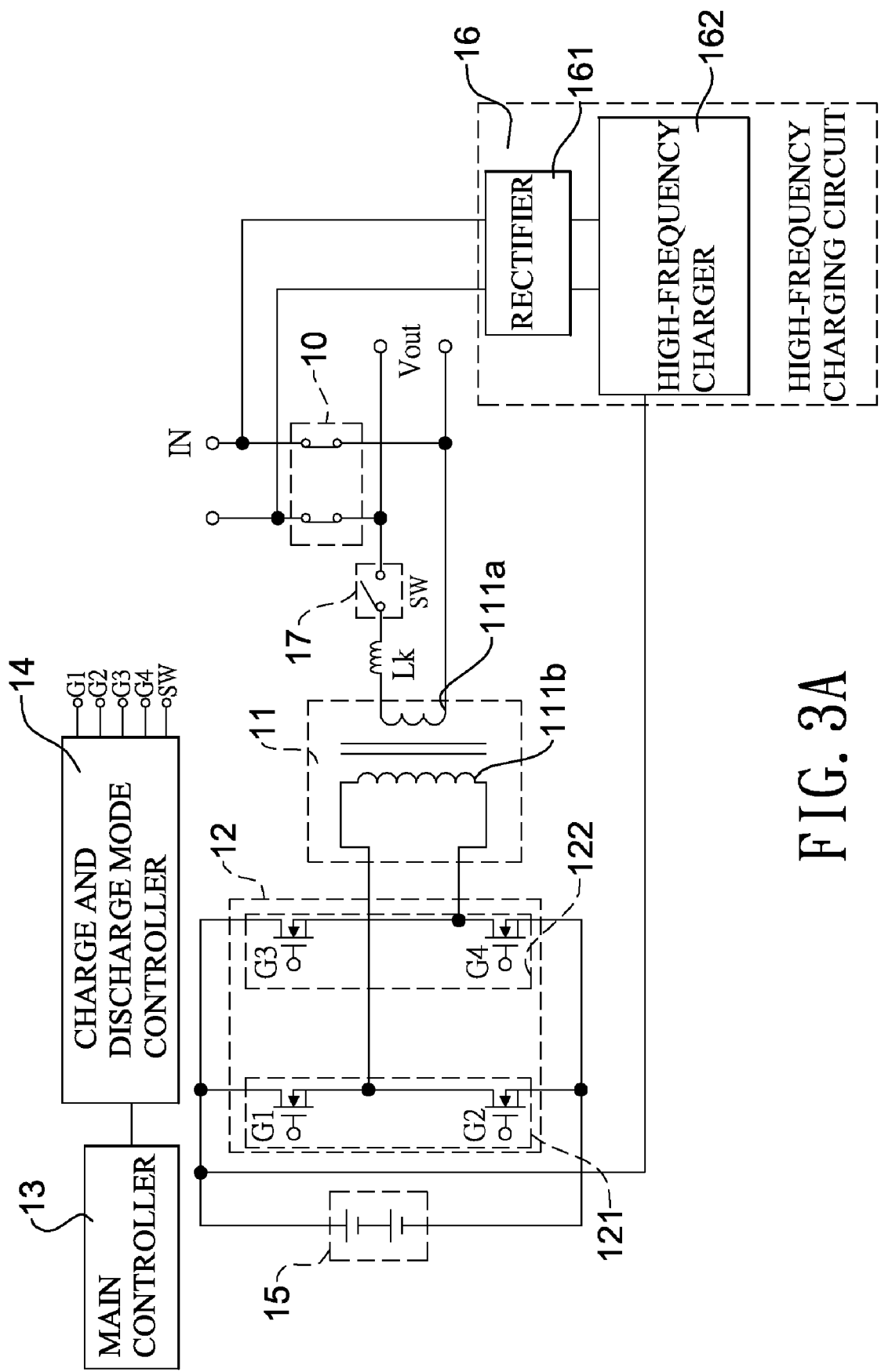
FIG. 3A is a circuit diagram under a small current charging mode in FIG. 2.

With reference to FIG. 2, a second embodiment of a line interactive UPS in accordance with the present invention is almost the same structurally except that an additional switch (17) is added. The switch (17) is serially connected between a winding (111a) of the low-frequency transformer (11) and a power switch set (10), and the switch (17) is controlled by the charge and discharge mode controller (14) to switch on or off. With reference to FIG. 3A, when the main controller (13) outputs a signal indicating that the current power capacity of the rechargeable battery (15) is full to the charge and discharge mode controller (14), the charge and discharge mode controller (14) switches off the switch (17) to disconnect the low-frequency transformer (11) with the AC power supply and the load. In the present embodiment, the switch (17) may be one of a relay, a MOSFET, a TRIAC and an IGBT.

Normally, the power capacity of the rechargeable battery slightly drops after being full for a while. When a slight drop in the power capacity of the rechargeable battery is detected, the main controller outputs a small current charging mode command to the charge and discharge mode controller. The charge and discharge mode controller keeps switching off the switch and disconnects the low-frequency transformer with the AC power supply and the load. Meanwhile, the high-frequency charging circuit is activated to directly convert the AC power into a DC current to charge the rechargeable battery.

Figure 3B:
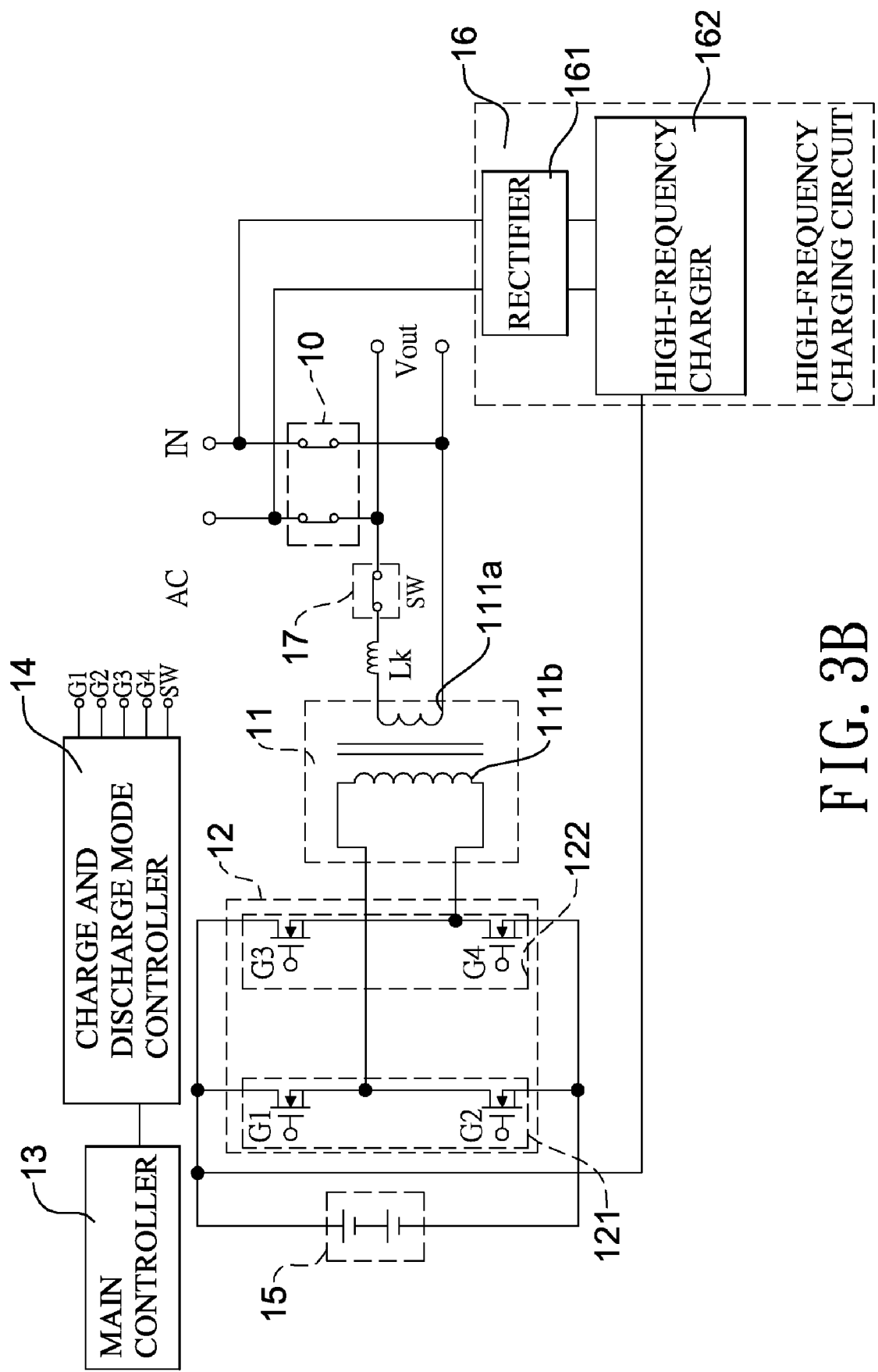
FIG. 3B is a circuit diagram under a large current charging mode in FIG. 2.
Figure 4:
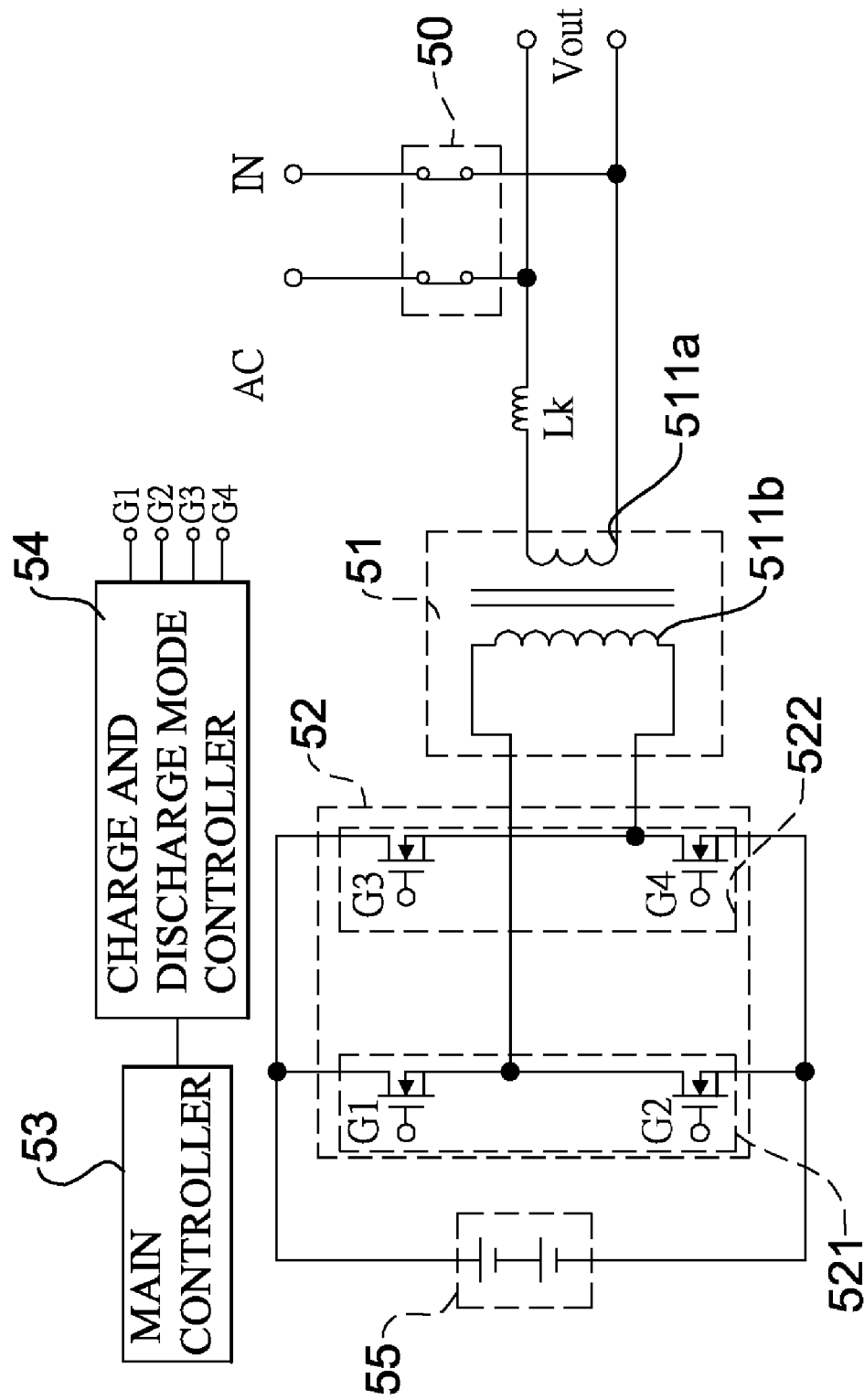
FIG. 4 is a circuit diagram of a conventional line interactive UPS.

With reference to FIG. 3B, the power of the rechargeable battery (15) of the UPS is converted into an AC power to supply the AC power to the load in case of a short period of the AC power outage, and the rechargeable battery drops to a low power capacity. The main controller (13) then outputs a large current charging mode command to the charge and discharge mode controller (14). The charge and discharge mode controller (14) keeps switching on the switch (17) to connect the low-frequency transformer (11) with the AC power supply and the load. The AC power supply performs fast charging to the rechargeable battery (15) with a large-current DC power through the low-frequency transformer (11) and the full-bridge switching circuit (12) until the rechargeable battery (15) reaches full power capacity.

In sum, since the time of normal AC power is longer than the time of irregular power supply or power outage, the present invention adds the high-frequency charging circuit to avoid the power loss caused by adopting the low-frequency transformer with a lower conversion efficiency to charge the rechargeable battery. Furthermore, when normal AC power is detected, the low-frequency transformer is disconnected with the AC power supply to prevent extra power consumption. Given such circuit structure, the UPS of the present invention only consumes 0.5 W in case of normal AC power, thereby attaining power-saving effect.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power-saving line interactive UPS, comprising:
   a power switch set connected to an AC power input terminal adapted to connect to an AC power supply to determine if the AC power supply supplies power to a load;
   a low-frequency transformer having two windings, one winding adapted to connect to the load and adapted to connect to the AC power supply;
   a full-bridge switching circuit having two half-bridge switching circuits having serially connected nodes connected to the other winding of the low-frequency transformer;
   a main controller connected to the power switch set;
   a charge and discharge mode controller connected to the main controller and the full-bridge switching circuit and activating the full-bridge switching circuit to enter a charging mode or a discharging mode in accordance with a charge command or a discharge command from the main controller;

a rechargeable battery connected to the full-bridge switching circuit and performing charging or discharging through the full-bridge switching circuit; and a high-frequency charging circuit connected between the AC power input terminal and the rechargeable battery and converting the AC power into a DC power to charge the rechargeable battery; and a switch connected between one of the two windings of the low-frequency transformer and the power switch set and controlled by the charge and discharge mode controller to switch on or off, wherein when the main controller detects that a current power capacity of the rechargeable battery is full and outputs a signal to the charge and discharge mode controller, the charge and discharge mode controller switches off the switch to disconnect the low-frequency transformer with the AC power supply and the load and the high-frequency charging circuit is activated to directly convert the AC power into the DC power to charge the rechargeable battery if a current power capacity of the rechargeable battery is not full but above a low power threshold; and when the main controller detects that a current power capacity of the rechargeable battery drops to the low power threshold and outputs a signal to the charge and discharge mode controller, the charge and discharge mode controller switches on the switch to connect the low-frequency transformer with the AC power supply and the load and charges the rechargeable battery through the low-frequency transformer and the full-bridge switching circuit until the rechargeable battery reaches a full power capacity.

2. The power-saving line interactive UPS as claimed in claim 1, wherein the high-frequency charging circuit comprises a rectifier and a high-frequency charger.

3. The power-saving line interactive UPS as claimed in claim 2, wherein the switch is a relay.

4. The power-saving line interactive UPS as claimed in claim 2, wherein the switch is a MOSFET.

5. The power-saving line interactive UPS as claimed in claim 2, wherein the switch is a TRIAC.

6. The power-saving line interactive UPS as claimed in claim 2, wherein the switch is an IGBT.

7. The power-saving line interactive UPS as claimed in claim 1, wherein the switch is a relay.

8. The power-saving line interactive UPS as claimed in claim 1, wherein the switch is a MOSFET.

9. The power-saving line interactive UPS as claimed in claim 1, wherein the switch is a TRIAC.

10. The power-saving line interactive UPS as claimed in claim 1, wherein the switch is an IGBT.

* * * * *